Patented Feb. 13, 1923.

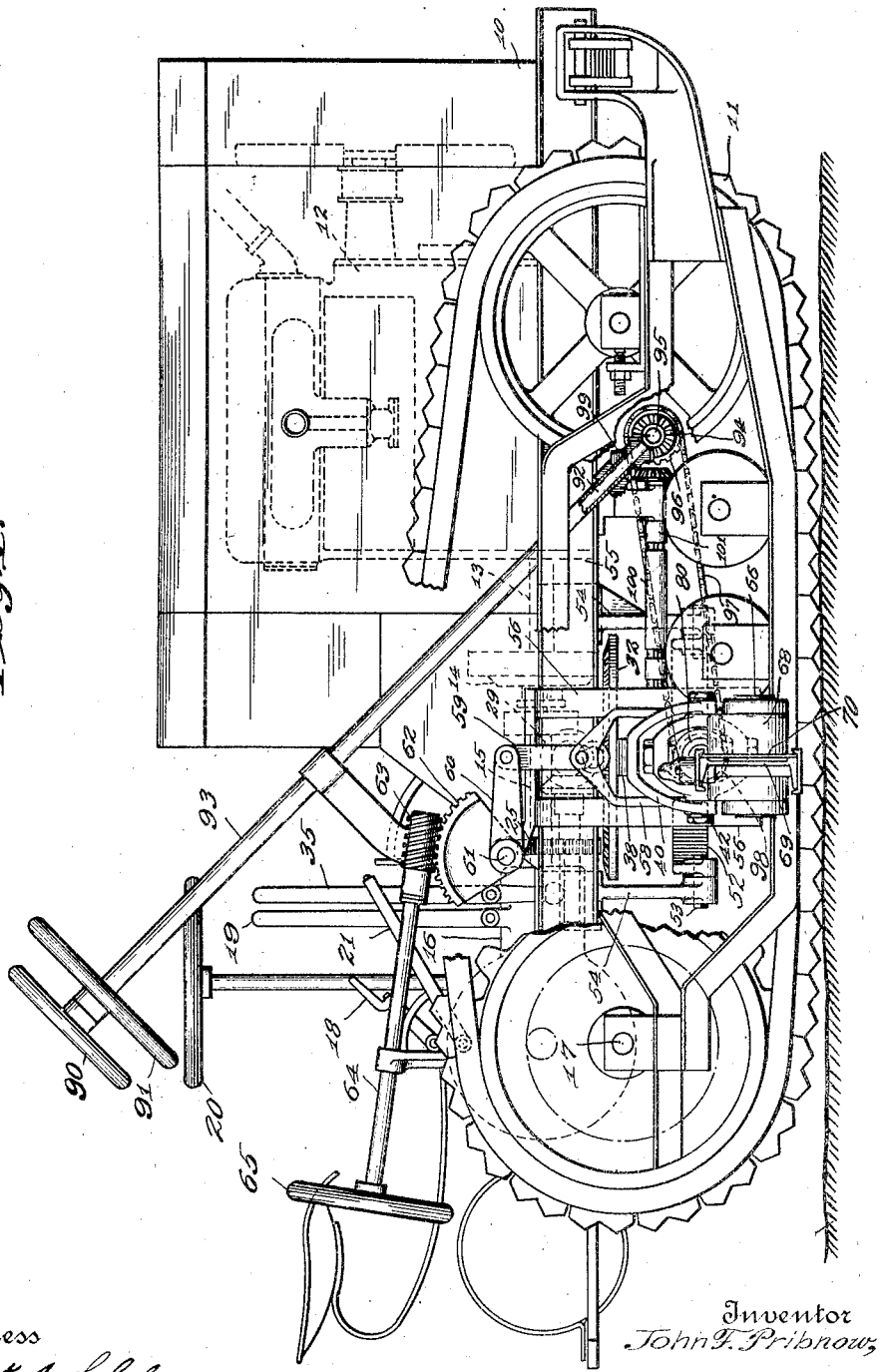

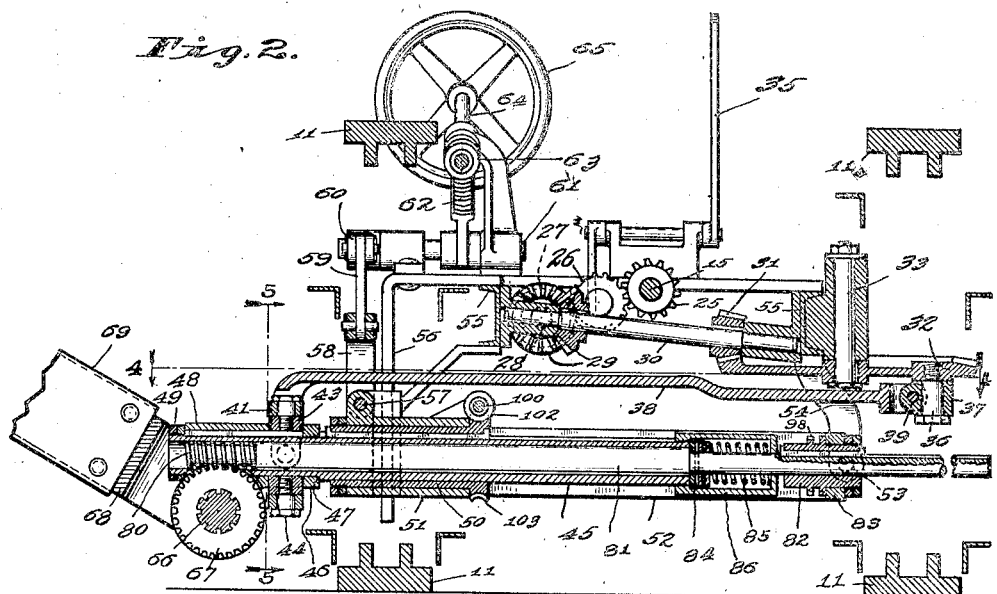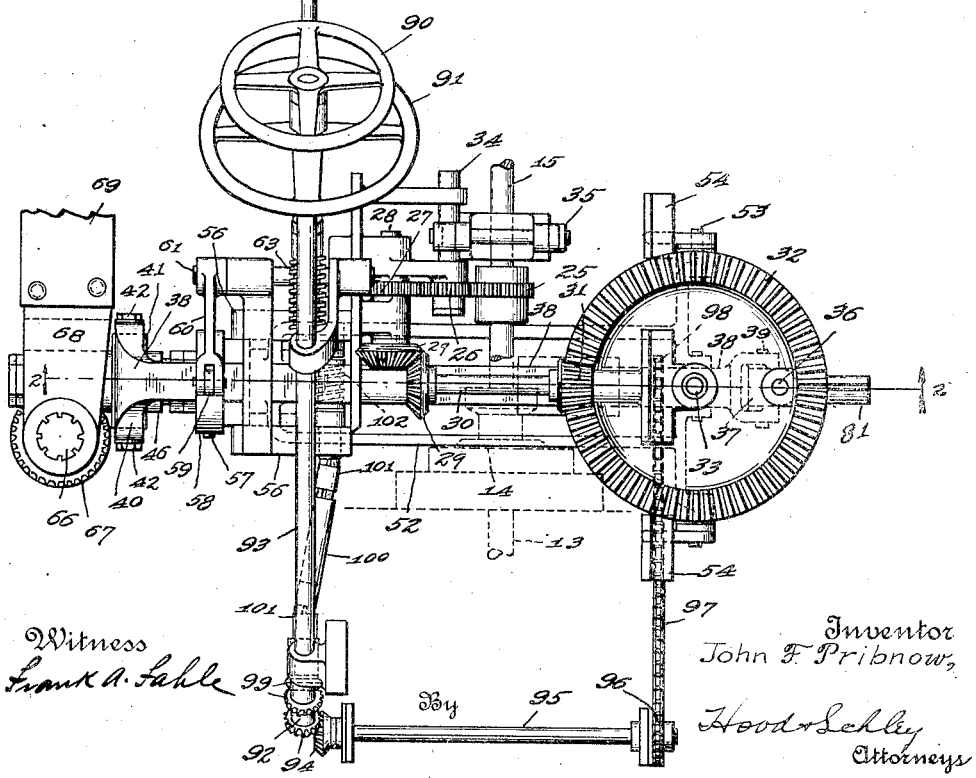

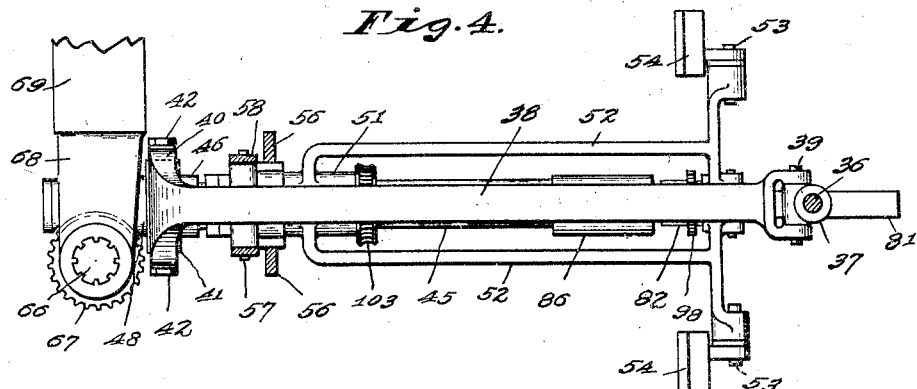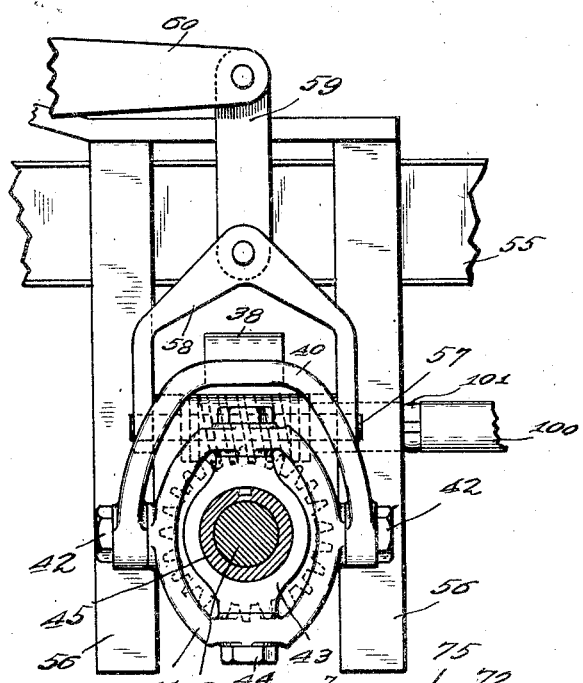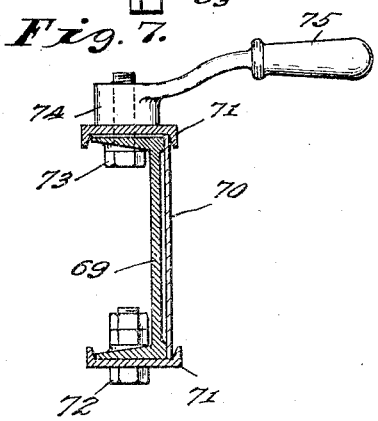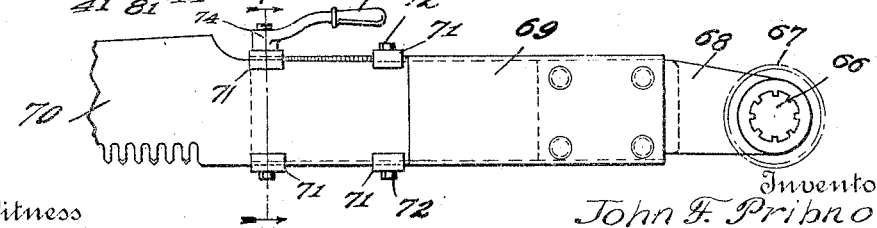

1,445,039

UNITED STATES PATENT OFFICE.

JOHN F. PRIBNOW, OF INDIANAPOLIS, INDIANA.

MOTOR DRAG SAW.

Application filed October 1, 1919. Serial No. 327,666.

*To all whom it may concern:*

Be it known that I, JOHN F. PRIBNOW, a citizen of the United States, residing at Indianapolis, in the county of Marion and State of Indiana, have invented a new and useful Motor Drag Saw, of which the following is a specification.

It is the object of my invention to provide a motor drag saw, which may be mounted on a tractor and operated by the tractor engine, which will have a rocking motion by which it feeds itself automatically into the wood, which will saw in any desired plane whether horizontal or vertical or oblique, which is adjustable to saw at various heights, and which permits the quick separation of the saw blade to enable the tractor to move away in case of danger that a tree will crash.

The accompanying drawing illustrates my invention: Fig. 1 is a side elevation of a tractor embodying my motor drag saw; Fig. 2 is a transverse section through the saw-operating mechanism, substantially on the line 2—2 of Fig. 3, with the saw in a vertical plane; Fig. 3 is a plan of the saw-operating mechanism shown in Fig 2, the parts of the tractor proper being substantially wholly removed, and the saw being in a horizontal plane; Fig. 4 is a section on the line 4—4 of Fig. 2; Fig. 5 is an enlarged section on the line 5—5 of Fig. 2; Fig. 6 is an elevation of the mounting of the saw blade; and Fig. 7 is an elevation on the line 7—7 of Fig. 6.

The tractor 10 may be of any desired type, being shown as having a caterpillar tread 11 which is suitably operated by the engine 12. The shaft 13 of the engine 12 is connected in the usual way through a clutch 14 to a transmission shaft 15, which leads through any convenient gear-box 16 to the differential or other driving mechanism on the rear axle 17. The clutch 14 may be controlled by the usual clutch pedal 18, and the gears in the gear-box 16 by any suitable gear-shift lever 19. The tractor may be steered by the usual steering wheel 20, and the usual brakes may be applied by the usual brake lever 21. All this is the usual mechanism, and is indicated in the barest outline.

The power for operating the saw is taken from the transmission shaft 15, ordinarily when the tractor is at rest by the reason of the disconnection of the tractor driving gear-train within the gear-box 16. To this end, the shaft 15 has fixed thereon a pinion 25, which may be connected through an idler gear 26 to a gear 27 on a shaft 28 which is connected by bevel gearing 29 to a transverse shaft 30 on which is a bevel pinion 31 meshing with a bevel gear 32 on a vertical shaft 33. The idler gear 26 is fixed on a shaft 34, which is axially shiftable by a shift lever 35 to move such idler gear into and out of mesh with the gears 25 and 27, to connect and disconnect the shaft 15 and the gear 32. When the connection is made, with the gear 26 in the position in which it is shown in Fig. 3, the bevel gear 32 may be put into and out of operation by the clutch 14.

The bevel gear 32 is provided with a downwardly projecting crank-pin 36, on which is a sleeve 37; and a thrust bar 38 is connected at one end to this sleeve 37 on a pivot pin 39 transverse to the crank pin 36 to permit the opposite end of the thrust bar to move up and down. Thus when the bevel gear 32 is operated the thrust bar 38 is reciprocated transversely of the tractor with a movement substantially like that of an engine-connecting rod. The opposite end of the thrust bar 38 from that which is mounted on the pin 39 is curved downward and bifurcated to form a fork 40, which is connected to a gimbal ring 41 by a pair of alined pivot bolts 42 parallel to the pin 39. The gimbal ring 41 surrounds a collar 43, to which it is connected by a pair of alined pivot bolts 44 perpendicular to the pivot bolts 42. The pivot bolts 39 and 42 permit the vertical movement of the collar 43 without interfering with the operation thereof by the thrust bar 38 and bevel gear 32; and the pivot bolts 44 permit the swinging of the gimbal ring 41 and thrust bar 38 due to the connecting-rod motion of the latter.

The collar 43 is fixed axially on a sleeve 45, by being held between a collar 46 bearing against a shoulder 47 and a saw-carrying sleeve 48 keyed on the sleeve 45 and held by a pair of nuts 49; the sleeve 48, the collar 43, and the collar 48 are clamped between these nuts and the shoulder 47. The sleeve 45, however, may turn within the collar 43. Thus the axial reciprocation of the collar 43 produces a like reciprocation of the sleeve 45.

The sleeve 45 is splined within an axially fixed sleeve 50 rotatably mounted within a bearing 51 which forms part of a subframe 52. This sub-frame is pivotally mounted at one end on pins 53 carried by downwardly projecting arms 54 from the tractor frame 55, and is vertically slidable at the other end, which has the bearing 51, between depending guide bars 56 also carried by the tractor frame. The pins 53, which are preferably in the vertical plane of the vertical shaft 33, are parallel to the pins 39 and 42, so that the frame 52 and the thrust bar 38 may swing up and down together. The frame 52 at the bearing 51 is pivotally connected by a pin 57 to a fork 58, which is hung by a link 59 from an arm 60 carried by a shaft 61 provided with a worm-wheel segment 62 operable by a worm 63 on an operating shaft 64 provided with a suitable operating wheel 65. By the operation of this wheel 65, the bearing 51 may be raised or lowered as desired, to swing the frame 52, the thrust bar 38, and the sleeve 45 up and down.

The saw-carrying sleeve 48 has journaled thereon a shaft 66 transverse to the sleeve 45 and slightly displaced therefrom. On this shaft 66 are fixed a worm wheel 67 and an arm 68, the latter being bifurcated to receive between its prongs the sleeve 48. The arm 68 has an extension in the form of the channel-iron 69, to which the saw 70 is releasably attached. This releasable attachment may take many forms; but in the form which I prefer the shank of the saw blade 70 lies against the outer face of the base of the channel iron 69, and two smaller channel-iron sections 71 overlie each edge flange of the channel-iron 69 and the adjacent edge of the shank of the saw 70, as is clear from Figs. 6 and 7. Three of these channel-iron sections 71 may be permanently clamped in place by bolts 72, but the forth is attached by a bolt 73 the nut 74 of which has an operating arm 75 by which it may be quickly operated. This channel-iron section and the opposite one bear against edges of the saw shank where they are parallel, but when the other pair of channel edges 71 bear against the saw shank edge the latter taper. Thus when the nut 74 is tight, the saw blade is held firmly in place, but when such nut is loosened the blade may readily be pulled loose from its mounting on the channel-iron 69. This permits the saw to be quickly disconnected and the tractor to be driven off in case of binding of the saw at a moment of danger.

The worm-wheel 67 meshes with a worm 80 on a rod 81 located within the sleeve 45. This rod is both rotatable and axially slidable within the sleeve 45. At the end opposite the worm 80 the rod 81 is splined within a sleeve 82 rotatably mounted within a bearing 83, which forms part of the sub-frame 52, and is in axial alinement with the bearing 51. A collar 84 pinned to the rod 81 may bear against the end of the sleeve 45 remote from the worm 80, and a compression spring 85 surrounding the rod 81 acts between this collar 84 and an inwardly projecting flange on an extension sleeve 86 screwed on the end of the sleeve 45. The spring 85 tends to force the rod 81 to the left (Fig. 2) within the sleeve 45, to hold collar 84 in engagement with the end of such sleeve; but permits such rod to be slid against such spring in case of pressure tending to turn the saw and its mounting about the axis of the shaft 66 in a clockwise direction (Fig. 2), the worm 80 and worm-wheel 67 acting as a rack and pinion. By turning the rod 81, the worm 80 operates the worm-wheel 67 to vary the normal angular relationship between the saw and the axis of such saw.

Two control wheels 90 and 91 are provided for rotating the sleeves 82 and 50 respectively. The wheel 90 is carried by a shaft 92 extending axially through a sleeve 93 on which the wheel 91 is mounted. At its lower end, the shaft 92 is connected by bevel gearing 94 to a shaft 95 which carries a sprocket 96 connected by a chain 97 to a sprocket 98 on the sleeve 82. Thus by manipulating the wheel 90 the sleeve 82 is turned on its axis, and the turning of such sleeve 82 produces a corresponding turning of the rod 81 on its axis, since such sleeve is splined on such rod. The lower end of the sleeve 93 is connected by bevel gearing 99 to a shaft 100, in which are suitable universal joints 101. The rear end of the shaft 100 is provided with a worm 102, which meshes with a worm-wheel 103 on the sleeve 50. Thus by manipulating the wheel 91, the sleeve 50 is turned on its axis, and the turning of such sleeve 50 produces a corresponding turning of the sleeve 45 on its axis since such two sleeves are splined together.

In operation, the tractor is driven to the desired place in the usual manner of tractors, usually with the saw-carrying arm 68 vertical (as shown in Fig. 3) to get it out of the way. The saw blade 70 may or may not be attached, and usually will be detached when the woods are thick. When the desired place is reached, and the saw is attached to the saw-carrying arm 68, the tractor is moved into the desired relationship to the tree or log to be sawed. The sawing may be either horizontal or vertical, or at an angle. The desired plane of sawing is obtained by manipulating the wheel 91, which rotates the sleeve 45 on its axis to turn the saw-carrying sleeve 48 with it to bring the arm 68 and saw 70 into such plane. If necessary in order to get the saw in the desired plane, the wheel 65 is manipulated to raise or lower the free end of the sub-frame 52 with relation to the tractor frame, such sub-frame in its movements carrying with it sleeve 45, the rod 81, the saw 70, and their associated parts. The wheel 90 is then manipulated to produce rotation of the rod 81. This rotation by the interaction of the worm 80 with the worm-wheel 67 swings the saw-carrying arm 68 and saw 70 about the axis of the shaft 66 until the teeth of the saw engage the tree or log, whereupon the farther rotation of the rod 81 forces it backward (or to the right in Fig. 2) against the spring 85, which is put under compression by the separation of the collar 84 from the end of the sleeve 45. Then, the tractor-driving train being disconnected in the gear box 16, the lever 35 is manipulated to intermesh the idler 26 with the gears 25 and 27; and, the engine being in operation, the clutch 14 is manipulated to control the movements of the bevel gear 32 and the thrust bar 38. With the clutch engaged, the thrust bar is reciprocated in the manner of the connecting rod of an engine, and causes the axial reciprocation of the sleeve 45 and its associated parts. The gimbal connection between the sleeve 45 and the thrust bar 38 permits the necessary relative movement between them during this reciprocation. The saw 70 is moved back and forth with the sleeve 45, the movement of the pivoted end of the saw or its carrying arm on the shaft 66 being a straight-line reciprocation. The saw itself, however, is tilted to an oblique angle with respect to such line of reciprocation, so that as it is reciprocated it rocks on the tree or log being sawed. Such rocking is permitted by the axial movement of the rod 81 within the sleeve 45, first against the compression of and then by the expansion of the spring 85, so that the saw teeth are maintained in engagement with the tree or log being sawed. The spring 85 by its expansion also automatically feeds the saw forward into the saw cut by turning it around the pivot shaft 66. The desired compression is maintained on the spring 85 throughout the sawing operation, by proper manipulation of the wheel 90; and if necessary, by proper movement of the tractor, as in case of horizontal sawing through large trees. The sawing is controlled by the clutch 14. In case of danger, the saw is stopped, the clamping nut 74 is loosened by the arm 75 to release the saw blade 70 from its support, the clutch is momentarily engaged to separate such support from the saw, the levers 19 and 35 are manipulated to throw in the tractor drive and throw out the saw drive, and then by proper manipulation of the clutch 14 the tractor is driven out of harm's way. This can be done in a very few seconds, in ample time to avoid a falling tree.

I claim as my invention:

1. In combination, with a supporting frame, a drag saw carried thereby, driving means for reciprocating said drag saw with a rectilinear back and forth movement, said saw being rotatable relatively to the frame about the axis of said rectilinear movement, and means for causing said saw to rock as it is reciprocated while in engagement with the article to be sawed with its teeth oblique to and back of the line of such back and forth movement irrespective of the plane of cut of the saw.

2. In combination, a vehicle, a frame mounted thereon and adjustable thereto in a vertical plane, a saw-carrying member reciprocably mounted in said frame, a saw pivotally mounted upon said reciprocable member, said reciprocable member being rotatable about its axis to vary the sawing plane of said saw, and resilient means associated with said reciprocable member for permitting the saw to rock about its pivotal mounting as said reciprocable member is reciprocated.

3. In combination, a vehicle, a frame mounted thereon and adjustable relatively thereto in a vertical plane, a saw carrying member reciprocably mounted in said frame, a saw pivotally mounted upon said reciprocable member and rotatable relatively to said frame about the axis of said member, and resilient means associated with said reciprocable member for permitting the saw to rock about its pivotal mounting as said member is reciprocated with the teeth of the saw back of the line of movement of said reciprocating member and variably oblique thereto irrespective of the plane of cut of said saw.

4. In combination, a supporting frame, a saw-carrying member reciprocably mounted in said frame, a saw pivotally mounted upon said reciprocable member, said reciprocable member being rotatable about its axis to vary the sawing plane of said saw, and resilient means associated with said reciprocable member for permitting the saw to rock about its pivotal mounting as said reciprocable member is reciprocated.

5. In combination, a supporting frame, a saw carrying member reciprocably mounted in said frame, a saw pivotally mounted upon said reciprocable member and rotatable on its reciprocable axis relatively to said frame, and resilient means associated with said reciprocable member for permitting the saw to rock about its pivot mounting as said reciprocable member is reciprocated irrespective of the plane of cut of said saw.

6. In combination, a supporting frame, a reciprocating sleeve carried by said frame, a saw pivotally mounted on said reciprocating sleeve, a rod mounted in said sleeve and co-operating with said saw so that by the adjustment of said rod the saw is adjusted about its pivot, said rod being mounted so that it will yield in one direction to permit rocking of the saw.

7. In combination, a supporting frame, a reciprocating sleeve carried by said frame, a saw pivotally mounted on said reciprocating sleeve, a rod mounted in said sleeve and co-operating with said saw so that by the adjustment of said rod the saw is adjusted about its pivot, said rod being mounted so that it will yield in one direction to permit rocking of the saw, and means for rotating said sleeve to vary the plane of sawing.

8. In combination, a supporting frame, a reciprocating sleeve carried by said frame, a saw pivotally mounted on said reciprocating sleeve, a rod mounted in said sleeve, gearing between said rod and said saw so that either rotation or longitudinal movement of the rod tilts the saw about its pivot, resilient means permitting axial movement of said rod within said sleeve so that the saw can rock about its pivot, and means for rotating said rod.

9. In combination, a supporting frame, a reciprocating sleeve carried by said frame, a saw pivotally mounted on said reciprocating sleeve, a rod mounted in said sleeve, gearing between said rod and said saw so that either rotation or longitudinal movement of the rod tilts the saw about its pivot, resilient means permitting axial movement of said rod within said sleeve so that the saw can rock about its pivot, means for rotating said rod, and means for rotating said sleeve to vary the plane of sawing.

10. In combination, a supporting frame, a reciprocating sleeve carried by said frame, a saw pivotally mounted on said reciprocating sleeve, a rod mounted in said sleeve, worm gearing between said rod and said saw, spring means tending to move said rod axially in one direction within said sleeve and for permitting it to be moved in the other direction so that the saw may rock on its pivot, and means for rotating said rod in said sleeve to vary the relation of the parts of said worm gearing to control the saw and the spring means.

11. In combination, a supporting frame, a reciprocating sleeve carried by said frame, a saw pivotally mounted on said reciprocating sleeve, a rod mounted in said sleeve, worm gearing between said rod and said saw, spring means tending to move said rod axially in one direction within said sleeve and for permitting it to be moved in the other direction so that the saw may rock on its pivot, means for rotating said rod in said sleeve to vary the relation of the parts of said worm gearing to control the saw and the spring means, and means for rotating said sleeve to vary the plane of sawing.

12. In combination, a frame, a sub-frame carried thereby and adjustable relative thereto in a vertical plane, a reciprocating member mounted in said sub-frame and vertically adjustable with it, a rotatable driving member on said first frame, and driving connections including a connecting rod and a gimbal ring between said rotatable driving member and said reciprocating member.

13. In combination, a supporting frame, a saw-carrying member reciprocably mounted in said frame, a saw pivotally mounted on said reciprocable member, and resilient means associated with said reciprocable member for permitting the saw to rock about its pivotal mounting as said reciprocable member is reciprocated, said saw being adjustable on its pivot to different average angular positions for all of which the action of said resilient means remains constant.

In witness whereof, I have hereunto set my hand at Indianapolis, Indiana, this eleventh day of September, A. D. one thousand nine hundred and nineteen.

JOHN F. PRIBNOW.